United States Patent [19]

Kako et al.

[11] 4,305,263

[45] Dec. 15, 1981

[54] CONSTANT VELOCITY UNIVERSAL JOINT

[75] Inventors: Hiroyoshi Kako, Aichi; Toru Tamano, Toyota; Toshiaki Yamamoto, Toyota; Seiho Kawakami, Toyota, all of Japan

[73] Assignee: Toyota Jidosha Kogyo Kabushiki Kaisha, Toyota, Japan

[21] Appl. No.: 75,675

[22] Filed: Sep. 14, 1979

[30] Foreign Application Priority Data

Jun. 1, 1979 [JP] Japan .................................. 54/68521

[51] Int. Cl.$^3$ ............................................. F16D 3/30
[52] U.S. Cl. ............................................. 64/21; 64/7
[58] Field of Search ......................................... 64/21, 7

[56] References Cited

U.S. PATENT DOCUMENTS

| | | | |
|---|---|---|---|
| 2,055,421 | 9/1936 | Weiss | 64/21 |
| 2,875,600 | 3/1959 | Miller, Jr. | 64/21 |
| 3,076,323 | 2/1963 | Aucktor | 64/21 |
| 3,475,924 | 11/1969 | Aucktor | 64/21 |
| 3,553,979 | 1/1971 | Noguchi et al. | 64/21 |
| 3,789,624 | 2/1974 | Camosso | 64/21 |
| 4,019,347 | 4/1977 | Krude | 64/21 |
| 4,116,020 | 9/1978 | Aucktor et al. | 64/21 |

Primary Examiner—Charles J. Myhre
Assistant Examiner—Magdalen Moy
Attorney, Agent, or Firm—Cushman, Darby & Cushman

[57] ABSTRACT

A constant velocity universal joint wherein its outer race has a larger radius of curvature than its inner race at the transverse sectional surface of the ball rolling groove at the point of contact between the ball and the ball rolling groove. Concave and convex surface portions of a ball rolling groove have a characteristic such that when the inner and outer races have the same radius of curvature at the transverse sectional surface of the ball rolling groove, the contact stress of the ball rolling groove of the outer race becomes lower than that of the inner race. By varying the radius of curvature on the transverse sectional surface of the ball rolling groove of the outer race from that of the inner race to render the contact stresses of the two grooves equal to each other, it is possible to facilitate working of the grooves and yet to achieve the same degree of precision finishes as has hitherto been achieved.

4 Claims, 7 Drawing Figures

CONSTANT VELOCITY UNIVERSAL JOINT

BACKGROUND OF THE INVENTION

This invention relates to a constant velocity universal joint.

A constant velocity universal joint is capable of transmitting torque at a uniform angular velocity from a drive shaft to a driven shaft which crosses the drive shaft, and is characterized by the fact that it has a very large maximum joint working angle in view of its construction. In construction, a constant velocity universal joint comprises an outer race located at the end of one shaft and having a plurality of ball rolling grooves formed on its inner circumferential surface, an inner race located at the end of the other shaft and having a plurality of ball rolling grooves formed on its outer circumferential surface, and a cage for holding in a predetermined position a ball disposed between the ball rolling grooves of the outer and inner races. The ball rolling grooves formed on the circumferential surfaces of the two races may have their centers displaced for an equal distance to right and left respectively from the center of the angle of the joint, so as to thereby control the movement of the cage and the ball and cause the ball to be positioned on a plane bisecting the angle formed by the drive shaft and the driven shaft at all times. This arrangement is conductive to the prevention of variations in the number of revolutions and torque.

Also, in some applications, the ball rolling grooves may be shaped such that they are elliptically arcuate in their transverse sectional surfaces to prevent the ball accidentally riding over the end portions of the grooves and damaging same when the ball rolling grooves are of a circularly arcuate shape. In this application, the ball joint is designed such that it can well withstand an impact load applied abruptly.

In this type of constant velocity universal joint of the prior art, the outer race and the inner race have the same radius of curvature at the transverse sectional surface of the ball rolling groove at the point of contact between the ball and the ball rolling groove. When one considers the contact stress between the ball and the ball rolling groove, the contact stress $\sigma_c$ can be expressed in the following relation: $\sigma_c \alpha$ (a load applied to the ball)$^{\frac{1}{3}}$. It is known in the theory of elasticity that the contact stress $\sigma_c$ is low when the ball rolling groove consists of concave surface portions and high when it consists of convex surface portions. Thus it is not desirable in working on the outer race groove that the outer race and the inner race have the same radius of curvature at the transverse sectional surface of the ball rolling groove at the point of contact between the ball and the ball rolling groove. The concave and convex surface portions of a ball rolling groove have a characteristic such that when the inner and outer races have the same radius of curvature at the transverse sectional surface of the ball rolling groove, the contact stress of the ball rolling groove of the outer race becomes lower than that of the inner race. Thus one has only to provide means for rendering the contact stresses of the two grooves equal to each other. The end can be attained by increasing the radius of curvature at the transverse sectional surface of the ball rolling groove of the outer race as compared with that of the inner race. This facilitates working or machining of the ball joint to achieve the desired precision finishes.

SUMMARY OF THE INVENTION

This invention has as its object the provision of a constant velocity universal joint wherein the outer race has a larger radius of curvature than the inner race at the transverse sectional surface of the ball rolling groove, whereby working of the ball rolling grooves can be facilitated without impairing the characteristics of the ball joint and the productivity of the ball joint can be increased.

According to the present invention, there is provided a constant velocity universal joint comprising an outer race attached to the end of one shaft, an inner race attached to the end of the other shaft crossing the one shaft, and a ball interposed between ball rolling grooves formed on the outer race and the inner race, wherein the improvement resides in that the outer race has a larger radius of curvature than the inner race at the transverse sectional surface of the ball rolling groove at the point of contact between the ball and the ball rolling groove.

DESCRIPTION OF THE PREFERRED EMBODIMENT

A preferred embodiment of this invention will now be described by referring to the accompanying drawings.

Figure 1:
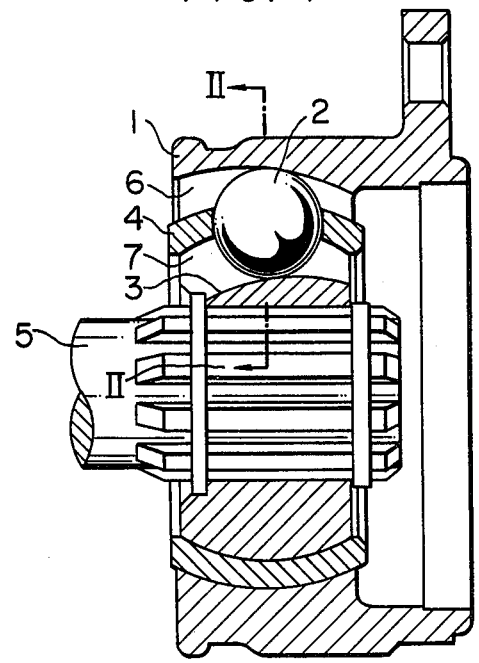
FIG. 1 is a vertical sectional view of a constant velocity universal joint.

In FIG. 1, there is shown a constant velocity universal joint comprising an outer race 1, a ball 2, an inner race 3, a cage 4 and a drive shaft 5. The outer race 1 and the inner race 3 are formed therein with a ball rolling groove 6 and a ball rolling groove 7 respectively which are constructed such that the groove 6 has a radius of curvature $\rho_1$ and the groove 7 has a radius of curvature $\rho_2$ at the transverse sectional surface of the point of contact between the ball 2 and the ball rolling groove 6(7) as shown in FIG. 2.

Figure 3:
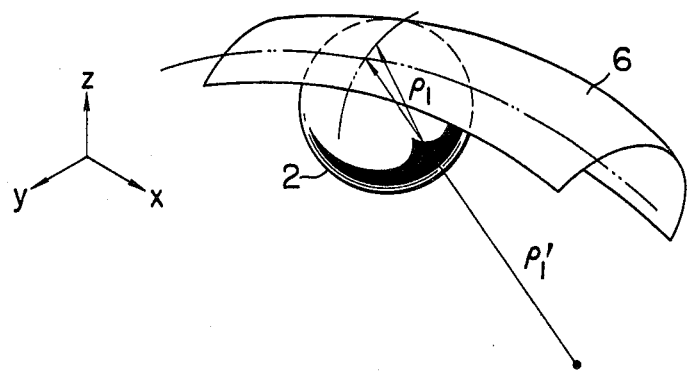
FIGS. 3 and 4 show the manner in which the ball is in contact with the ball rolling groove of the outer race and the ball rolling groove of the inner race respectively.
Figure 4:
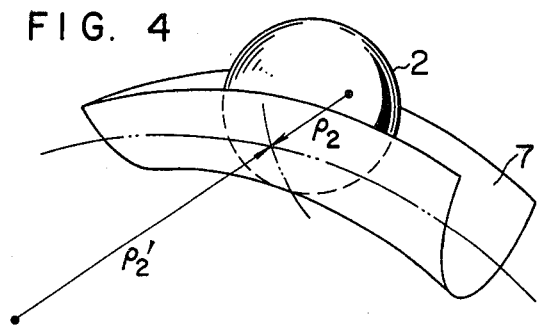

FIGS. 3 and 4 show the ball rolling groove 6 and the ball rolling groove 7 respectively in a perspective view. FIG. 3 shows the manner in which the ball 2 is in contact with the ball rolling groove 6 of the outer race 1. Dash-and-dot lines indicate the point at which the ball 2 is in rolling contact with the groove 6 and the arc of the point of contact between the ball 2 and the groove 6 which is at right angles to the groove 6. In the figure, the radii of curvature of the dash-and-dot lines are designated by $\rho'_1$ and $\rho_1$ respectively. FIG. 4 shows the manner in which the ball 2 is in contact with the ball rolling groove 7 of the inner race 3. Like FIG. 3, FIG. 4 shows that the radius of curvature of the point of contact on the surface disposed at right angles to the groove is designated by $\rho_2$ and the radius of curvature on the rolling surface is designated by $\rho'_2$.

Figure 2:
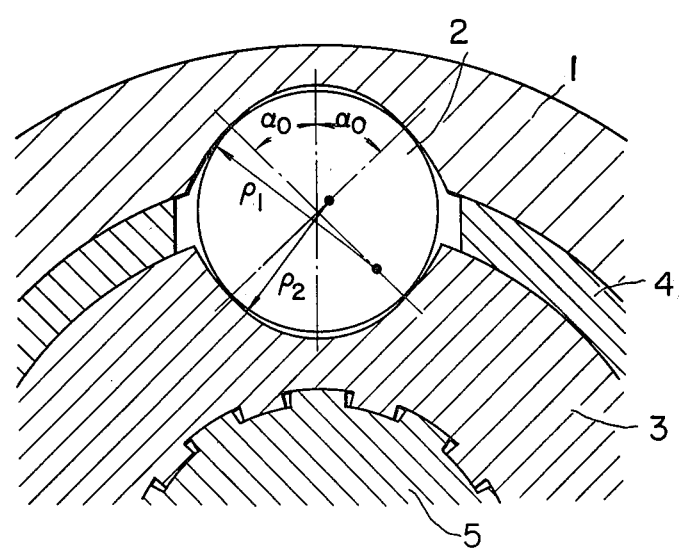
FIG. 2 is a sectional view, on an enlarged scale, taken along the line II—II in FIG. 1.

Assuming that an angle of contact $\alpha_o$ shown in FIG. 2 is the same for the outer race 1 and inner race 3, forces of the same magnitude will be exerted on the points of contact of the ball 2 with the outer race 1 and the inner race 3 when torque is applied to the joint for transmission. The ball 2 is in contact with the grooves 6 and 7 in such a manner that as shown in FIGS. 3 and 4, the ball rolling groove 6 of the outer race 1 is concave in a yz surface portion and also concave in an xz surface portion and the ball rolling groove 7 of the inner race 3 is concave in a yz surface portion and convex in an xz surface portion. Also, since the ball and the ball rolling grooves are formed of resilient material, the ball will not contact the ball rolling grooves at one point but a surface-to-surface contact will take place when the ball is brought into contact with the ball rolling grooves. Thus the point of contact between the ball 2 and the ball rolling groove 6 of the outer race has a larger area than the point of contact between the ball 2 and the ball rolling groove 7 of the inner race 3. Accordingly, stress at the point of contact is higher in the ball rolling groove 7 of the inner race 3 than in the ball rolling groove 6 of the outer race 1. The stress at the point of contact between the ball 2 and the ball rolling groove 7 of the inner race 3 can be made equal to the stress at the point of contact between the ball 2 and the ball rolling groove 6 of the outer race 1 either by making the radius of curvature of the contact surface of the inner race 3 close to the radius of the ball 2 or by increasing the radius of curvature of the contact surface of the outer race 1. Stated differently, one has only to vary the radius of curvature $\rho_1$ of the contact surface of the outer race 1 with the ball 2 and the radius of curvature $\rho_2$ of the contact surface of the inner race 3 from each other in such a manner that $\rho_1 > \rho_2$.

Figure 5:
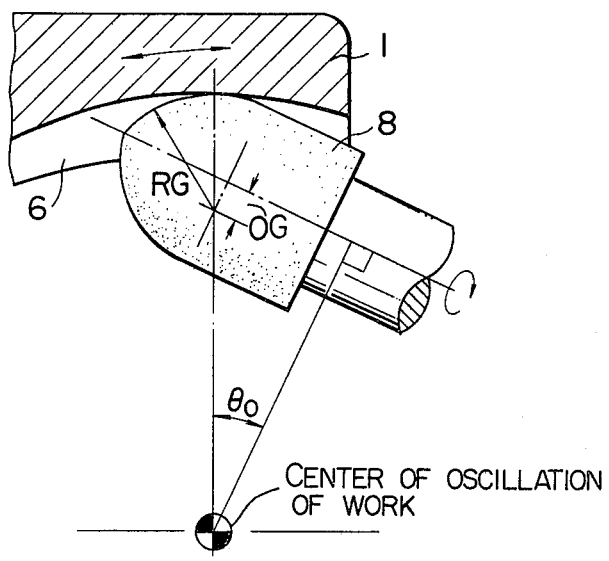
FIG. 5 is a view in explanation of the manner in which working of the ball rolling groove of the outer race is carried out.
Figure 6:
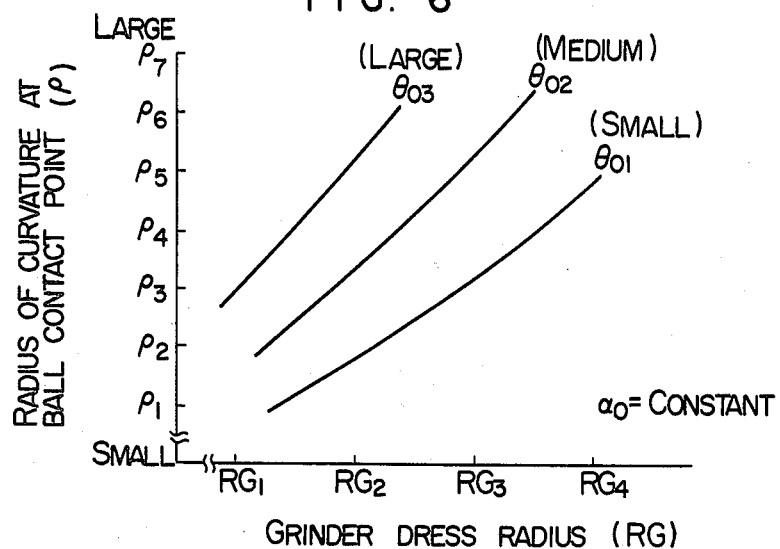
FIG. 6 is a theoretical graph showing the shape of the ball rolling groove in relation to the setting of the tool.
Figure 7:
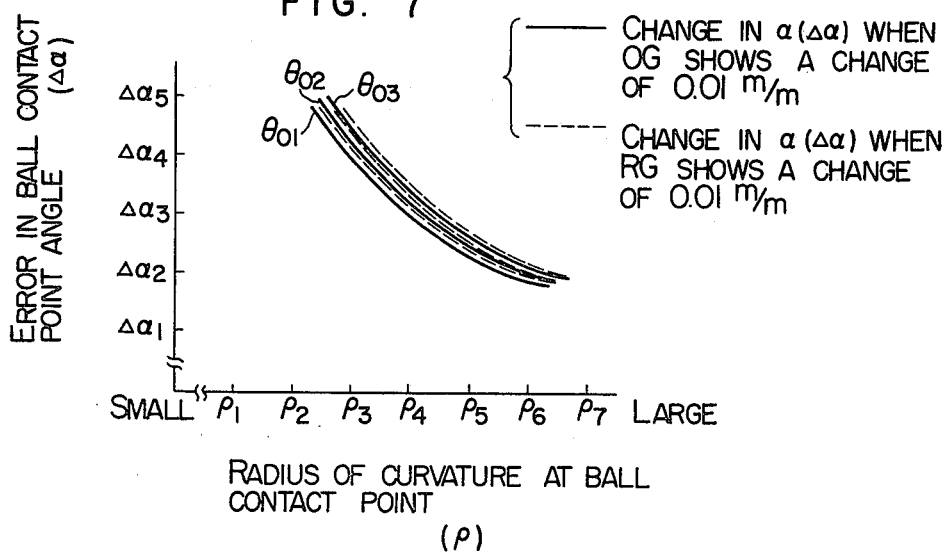
FIG. 7 is a theoretical graph showing the relation between the radius of curvature of the ball rolling groove at the point of contact between the ball and the ball rolling groove and changes in the shape of the ball rolling groove caused by errors in the setting of the tool.

Let us now discuss the precision with which the ball rolling groove 6 of the outer race 1 is worked. Assuming that a method illustrated in FIG. 5 is adopted as a process for grinding the ball rolling groove, the relation between various profiles and the precision of finishes is as shown in FIGS. 6 and 7. More specifically, a grinder 8 has a curved surface of revolution of a radius RG centered at a point which is offset by a distance OG from the axis of rotation of the grinder 8. Also, the grinder 8 is set such that it is inclined by $\theta_o$. The outer race 1 rotates about the center of oscillation of the work when it is subjected to grinding. The relation between the radius of curvature $\rho$ and the dress radius RG of the grinder is plotted in FIG. 6 as a parameter of the angle of inclination $\theta_o$ of the grinder 8 when the distance OG is selected in a manner to keep a ball contact angle $\alpha$ constant. The relation between the radius of curvature $\rho$ and a change $\Delta\alpha$ in the ball contact angle $\Delta_o$ occurring when a change of 0.01 m/m is made in the OG and RG, which are the factors concerned in the setting of the grinder, is plotted in FIG. 7 as a parameter of the angle of inclination $\theta_o$ of the grinder 8. As can be seen in these figures, the radius of curvature $\rho$ can be selected arbitrarily by selecting the various factors ($\theta_o$, RG and OG) when the ball contact angle $\alpha_o$ of a given value is selected. However, it is believed that the error $\Delta\alpha$ of the ball contact angle relative to the errors of OG and RG is determined by the radius of curvature $\rho$. And the larger the radius of curvature $\rho$, the smaller is the error $\Delta\alpha$. Thus the radius of curvature $\rho$ is advantageously set at a larger value for achieving precision of finishes.

For the reasons stated hereinabove, it is not only unnecessary but also makes it difficult to maintain the finishes at a high precision level to obtain $\rho_1 \approx \rho_2$. It would have excellent effects in the production of a constant velocity universal joint to increase the radius of curvature of the ball rolling groove of the outer race at the point of contact between the ball and the ball rolling groove as compared with that of the inner race, so long as no adverse influences are exerted on strength, or so long as the contact stress between the inner race and the ball is made equal to the contact stress between the outer race and the ball.

What is claimed is:

1. A constant velocity universal joint comprising:
   an outer race attached to the end of one shaft;
   an inner race attached to the end of another shaft crossing said one shaft; and
   balls of equal size interposed between ball rolling grooves of equal size formed on said outer race and ball rolling grooves of equal size formed on said inner race; wherein the improvement resides in that the outer race has a larger radius of curvature than the inner race at the transverse sectional surface of the ball rolling grooves at the point of contact between each ball and its groove, and said radii of curvature of said races are larger than the radius of said balls.

2. A constant velocity universal joint as set forth in claim 1, wherein the improvement further resides in that the ball rolling grooves are of a shape produced by a working operation carried out by using a tool having a curved surface of revolution.

3. A constant velocity universal joint as set forth in claim 1, wherein the improvement further resides in that the path of rolling movement of the ball on the ball rolling grooves and the axis of rotation of a tool for forming the ball rolling grooves are located in the same plane.

4. A constant velocity universal joint as set forth in claim 1, wherein the improvement further resides in that the contact stress at the point of contact between each ball and the outer race is substantially equal to the contact stress at the point of contact between the ball and the inner race, when a load is applied to the joint.

* * * * *